Patented Aug. 4, 1931

1,816,988

UNITED STATES PATENT OFFICE

HARRY H. POTTS, OF CHICAGO, ILLINOIS

STRUCTURAL MATERIAL

No Drawing.    Application filed May 24, 1930.   Serial No. 455,460.

My invention relates to building materials and more specifically to concrete for load carrying walls or equivalent structures. It includes among its objects and advantages the manufacture of light weight concrete having certain outstanding desirable characteristics from a material which was previously a waste product.

For many years, probably for decades, the manufacture of concrete from a wide variety of aggregates has been practiced and preached. Among other materials advanced as suitable for this purpose, blast furnace slag has been repeatedly advocated. Prior to my invention, the only slag concrete on the market was of substantially the same density as ordinary concrete, i. e. about 140 pounds per cubic foot or more, and was made from slag solidified by slow cooling and subsequently crushed and screened. I have discovered that it is possible to treat or process slag in such a way as to secure nodules or granules having a reticulated structure that is full of small holes and porous, while at the same time the solid frame or skeleton constituting the granule is itself hard and of material strength.

With material of this reticulated granular structure it is possible to produce excellent concrete weighing less than 110 lbs. per cubic foot and having compressive strength ample for load-carrying purposes, so that it can be used in the more important load-bearing portions of building structure.

One way of obtaining the slag in such reticulated granules is to take ordinary blast furnace slag, which is chemically composed of an average analysis of lime 45%, silica 35%, alumina 16%, manganese oxide 3%, and sulphur 1%, and pour a stream of the molten slag into a powerful and much larger stream of cold water, after which the commingled water and granules of slag pass down a flume.

In one successful operation, according to the invention, sufficient water is used so that the heat of the slag increases the temperature of the water by substantially 40° Fahrenheit.

A sieve test of one sample of such slag from which suitable concrete has been made is as follows:

*Graduation of finished product*

| Sieve No. | Retained on seive | Passing sieve |
|---|---|---|
| | Per cent | Per cent |
| 4 | 0.18 | 99.82 |
| 8 | 9.16 | 99.34 |
| 16 | 9.21 | 90.79 |
| 30 | 54.76 | 45.24 |
| 50 | 91.16 | 8.84 |
| 100 | 97.96 | 2.04 |

It should be noted that more than 80% of this material is too coarse to pass a 50 mesh sieve and too fine to be retained by a 16 mesh sieve, and that practically all of it passes through the 8 mesh sieve.

For making up precast building units with such an aggregate, one satisfactory mix which I have employed is made up of 40 pounds of slag, 6½ pounds of cement and one gallon of water. The above materials are placed in a mechanical mixer and mixed for from three to ten minutes, after which the units may be formed in any one of several ways well known in the art.

The material is also suitable for monolithic and for poured concrete structures generally. One satisfactory mix for poured concrete is made up of 164 pounds of slag, 40 pounds of cement and 5½ gallons of water. It will be noted that this mix contains somewhat more cement and somewhat more water than that recommended as preferable for building units.

The finished product usually weighs from 85 to 110 pounds per cubic foot. It can be sawed, and cut to shape with chisels, and it will receive an ordinary nail and retain or grasp the nail and hold it in place approximately as effectively as wood. This, combined with its lightness, renders it especially desirable for many uses where the denser concretes are less desirable. The use of granulated slag in this way makes a commercial commodity out of such slag, the disposal of which, so far as I am aware, has heretofore been an item of expense.

The mix given for units averages about 1700 pounds per square inch in compressive strength, so that cellular units with openings amounting to substantially forty two per cent of the gross area can be made with strengths well above the standard building code requirements of 700 pounds per square inch of gross area. It will be evident that with forty two per cent of the area cored out, the material itself need only have a strength of 1200 pounds per square inch of net area, to fulfill the above requirement.

I have also been successful according to the foregoing directions in producing units of absorption low enough to come within the standard requirements of the American Concrete Institute for units to be exposed to soil or weather in the finished work. These requirements are that the material "shall not absorb more than 10 per cent of the dry weight of the unit when tested as hereinafter specified, except when it is made of concrete weighing less than 140 pounds per cubic foot. For block or tile made with concrete weighing less than 140 pounds per cubic foot, the absorption in per cent by weight shall not be more than 10 multiplied by 140 and divided by the unit weight in pounds per cubic foot of the concrete under consideration."

The test called for is as follows:

The specimens shall be dried to constant weight at a temperature of from two hundred and twelve (212) to two hundred and fifty (250) degrees Fahrenheit and the weight recorded. After drying, the specimens shall be immersed in clean water at approximately seventy (70) degrees Fahrenheit for a period of twenty-four (24) hours. They shall then be removed, the surface water wiped off and the specimens re-weighed. The absorption is the weight of the water absorbed, divided by the weight of the dry specimen and multiplied by one hundred (100).

Slag has in certain instances in the past been granulated by pouring it into a pit containing water, where it is allowed to remain for some time. When the slag is removed from such a pit, the granules are soft in the sense that most of them may readily be crushed to dust or fines between the fingers. I believe that this results from the relatively high temperature of the water, which is at or near the boiling point most of the time, the relatively slow initial cooling from the molten condition due to insufficient turbulence, and the relatively long time of contact between the entering slag and the hot water before removal from the pit, or to one or more of these causes.

The slag produced according to my invention is hard in the sense that most of the granules are too hard to be readily pulverized to fines between the fingers.

Without further elaboration the foregoing will so fully explain my invention that others may, by applying knowledge current at the time of application readily adapt the same for use under various conditions of service. It will, for instance, be obvious that the proportions of the ingredients may be varied over a considerable range to meet varying requirements as to strength and cost. The material may obviously be made up in an unlimited variety of shapes and sizes including the shapes commonly referred to by the trade as blocks, tiles, bricks, etc. The word "unit" is employed herein as a generic designation of any object having a set shape before its incorporation in a complete building.

This application includes subject matter previously disclosed and claimed in my earlier applications, Serial No. 426,777 filed February 7, 1930, and Serial No. 315,928 filed October 29, 1928.

I claim:

1. Light-weight load bearing concrete, made of water, portland cement, and an aggregate consisting essentially of hard particles of granulated blast furnace slag, said aggregate being of such character and size as to produce a concrete attaining compressive strength of not less than twelve hundred pounds per square inch of net area, and having a density of not more than substantially one hundred and ten pounds per cubic foot of net volume, and being adapted to be sawed and cut with chisels and to receive and retain ordinary nails.

2. Light-weight load bearing concrete made of water, portland cement, and an aggregate consisting essentially of hard reticulated particles of water-granulated blast furnace slag, substantially eighty per cent of which will pass a sixteen mesh sieve and be retained by a fifty mesh sieve, said aggregate being of such character as to produce a concrete attaining compressive strength of not less than twelve hundred pounds per square inch of net area, and having a density of not more than substantially one hundred and ten pounds per cubic foot of net volume, and being adapted to be sawed and cut with chisels and to receive and retain ordinary nails.

3. Light-weight load bearing concrete made of water, portland cement, and an aggregate consisting essentially of particles of blast furnace slag water-granulated in running water materially below the boiling point, said aggregate being of such character and size as to produce a concrete attaining compressive strength of not less than twelve hundred pounds per square inch of net area, and having a density of not more than substantially one hundred and ten pounds per cubic foot of net volume, and being adapted to be sawed and cut with chisels and to receive and retain ordinary nails.

In testimony whereof I hereunto affix my signature.

HARRY H. POTTS.